(12) United States Patent
Trenerry et al.

(10) Patent No.: US 12,465,842 B2
(45) Date of Patent: Nov. 11, 2025

(54) HEAT MOULDABLE MOUTH GUARD

(71) Applicant: NEOMORPH PTY LTD, Belair (AU)

(72) Inventors: Amanda Trenerry, Belair (AU); Aisha Sirop, Mount Barker (AU)

(73) Assignee: Neomorph Pty Ltd, Belair (AU)

( * ) Notice: Subject to any disclaimer, the term of this patent is extended or adjusted under 35 U.S.C. 154(b) by 397 days.

(21) Appl. No.: 17/798,692

(22) PCT Filed: Feb. 10, 2021

(86) PCT No.: PCT/AU2021/050109
§ 371 (c)(1),
(2) Date: Aug. 10, 2022

(87) PCT Pub. No.: WO2021/159174
PCT Pub. Date: Aug. 19, 2021

(65) Prior Publication Data
US 2023/0129171 A1 Apr. 27, 2023

(30) Foreign Application Priority Data
Feb. 11, 2020 (AU) .................................. 2020900372

(51) Int. Cl.
*A63B 71/08* (2006.01)

(52) U.S. Cl.
CPC ........ *A63B 71/085* (2013.01); *A63B 2209/00* (2013.01)

(58) Field of Classification Search
CPC .............. A63B 71/085; A63B 2209/00; A63B 2071/0694; A63B 2071/086; A63B 2208/12; A61C 7/14; A61C 5/90; A61F 2005/563; A61F 5/566; A61F 5/56; Y10S 602/902

See application file for complete search history.

(56) References Cited

U.S. PATENT DOCUMENTS

| 5,031,638 A | | 7/1991 | Castaldi | |
|---|---|---|---|---|
| 5,718,575 A | * | 2/1998 | Cross, III | ............. A63B 71/085 433/6 |
| 5,826,581 A | * | 10/1998 | Yoshida | ............... A63B 71/085 128/862 |

(Continued)

FOREIGN PATENT DOCUMENTS

| CA | 853100 A | 10/1970 |
|---|---|---|
| EP | 0359135 A1 | 3/1990 |
| WO | WO 2006/108209 A1 | 10/2006 |

OTHER PUBLICATIONS

Extended European Search Report issued for European Application No. 21752956.9, dated Feb. 6, 2024 (8 pages).

*Primary Examiner* — Ophelia A Hawthorne
(74) *Attorney, Agent, or Firm* — Klarquist Sparkman, LLP

(57) ABSTRACT

The present disclosure relates to heat mouldable mouth guards, to methods for using the mouth guards, and to methods for producing the mouth guards. In certain embodiments, the present disclosure provides a heat mouldable mouth guard, the mouth guard comprising: an inner framework comprising a semi-rigid thermoplastic; and an outer layer comprising an elastomeric thermoplastic which has a melting temperature higher than the semi-rigid thermoplastic of the inner framework, wherein the outer layer substantially encapsulates the inner framework.

25 Claims, 3 Drawing Sheets

(56) References Cited

U.S. PATENT DOCUMENTS

| | | |
|---|---|---|
| 6,302,110 B1 | 10/2001 | Yoshida |
| 7,210,483 B1 | 5/2007 | Lesniak et al. |
| 9,474,483 B2 * | 10/2016 | Gribb ................... A61B 5/08 |
| 2004/0154626 A1 | 8/2004 | Washburn et al. |
| 2013/0298917 A1 | 11/2013 | Poisson et al. |
| 2014/0290668 A1 * | 10/2014 | Thornton ............ A61M 16/049 |
| | | 433/213 |
| 2014/0352704 A1 * | 12/2014 | Farrell ................. A63B 71/085 |
| | | 128/862 |

* cited by examiner

HEAT MOULDABLE MOUTH GUARD

PRIORITY CLAIM

This application is the § 371 U.S. National Stage of International Application No. PCT/AU2021/050109, filed Feb. 10, 2021, which was published in English under PCT Article 21(2), which in turn claims priority to Australian Provisional Patent Application 2020900372 filed on 11 Feb. 2020, the contents of which are hereby incorporated by reference.

FIELD

The present disclosure relates to heat mouldable mouth guards, to methods for using the mouth guards, and to methods for producing the mouth guards.

BACKGROUND

Mouth guards are devices used to protect teeth from grinding or clenching during sleep, to reduce impact forces to the teeth during sport, and to protect from injuries while playing sports.

Custom mouth guards are made by a dentist, dental clinician or technician from a mould or scan taken of the teeth, and while they provide good protection for the teeth due to the custom fitting, they are generally costly, take time to make, and are not adjustable once formed.

Stock mouth guards come in fixed sizes and simply cover the teeth. There is no fitting of these types of mouth guards to the teeth. Although these type of mouth guards are relatively inexpensive, typically they do not provide a tight fit to the teeth, they may be uncomfortable to wear and/or they may provide less protection.

"Boil and bite" mouth guards provide a good compromise between custom made mouth guards and stock mouth guards. These type of heat mouldable mouth guards are significantly less expensive than custom mouth guards but can still be moulded to fit the teeth by heating the mouth guard until it softens and then placing over the teeth and biting together, and forming around the contours of the mouth and teeth with finger pressure and mouth suction.

Some heat mouldable mouth guards simply use a single heat mouldable plastic layer. However, these mouth guards are often bulky, uncomfortable and do not provide a secure custom fit which can reduce impact protection. Other heat mouldable mouth guards use a hard shelled outer with an inner softer heat sensitive liner, however these type of mouth guards are typically bulky in nature and/or do not provide a good fit to the teeth.

In addition, some types of heat mouldable mouth guards are not suitable with orthodontic devices as they cannot be easily detached from the devices.

Accordingly, there is a need for improved commercially manufactured mouth guards, for example mouth guards that provide a secure custom fit to the teeth, hold their shape over time, have improved comfort, have reduced adherence to orthodontic devices, and/or to provide a commercial choice.

SUMMARY

The present disclosure relates to heat mouldable mouth guards, to methods for using the mouth guards and to methods for producing the mouth guards.

Certain embodiments of the present disclosure provide a heat mouldable mouth guard, the mouth guard comprising:
an inner framework comprising a semi-rigid thermoplastic; and
an outer layer comprising an elastomeric thermoplastic which has a melting temperature higher than the semi-rigid thermoplastic of the inner framework,
wherein the outer layer substantially encapsulates the inner framework.

Certain embodiments of the present disclosure provide a heat mouldable mouth guard, the mouth guard comprising:
an inner framework comprising a semi-rigid thermoplastic; and
an outer layer located around the inner framework and comprising an elastomeric thermoplastic, the outer layer supporting the configuration of the inner framework when the inner framework is heat softened to become pliable.

Certain embodiments of the present disclosure provide a heat mouldable mouth guard, the mouth guard comprising:
an inner framework comprising a semi-rigid thermoplastic; and
an outer layer comprising an elastomeric thermoplastic, the outer layer supporting the configuration of the inner framework when the inner framework becomes pliable due to heating,
wherein the outer layer substantially encapsulates the inner framework.

Certain embodiments of the present disclosure provide a method of protecting teeth of a subject from an impact injury, the method comprising wearing a mouth guard as described herein and thereby protecting the teeth from an impact injury.

Certain embodiments of the present disclosure provide use of a mouth guard as described herein for protecting teeth from an impact injury.

Certain embodiments of the present disclosure provide a method of fitting a mouth guard for wearing by a subject, the method comprising heating the mouth guard as described herein and fitting the heat softened mouth guard to the teeth of the subject.

Certain embodiments of the present disclosure provide a method of producing a mouth guard, the method comprising:
substantially encapsulating an inner framework comprising a semi-rigid thermoplastic which is heat softenable with an outer layer comprising an elastomeric thermoplastic having a melting temperature higher than the semi-rigid thermoplastic of the inner framework; and
producing the mouth guard.

Certain embodiments of the present disclosure provide a mouth guard produced by a method as described herein.

Certain embodiments of the present disclosure provide an inner framework for a mouth guard, the inner framework comprising a semi-rigid thermoplastic and one of more apertures in the incisal/occlusal and/or palatal/lingual surface of the framework and/or one or more apertures in the buccal/labial surface of the framework.

Certain embodiments of the present disclosure provide use of an inner framework as described herein in a heat mouldable mouth guard.

Certain embodiments of the present disclosure provide a heat mouldable mouth guard comprising an inner framework as described herein.

Other embodiments are described herein.

BRIEF DESCRIPTION OF THE FIGURES

Certain embodiments are illustrated by the following figures. It is to be understood that the following description

DETAILED DESCRIPTION

Figure 1:
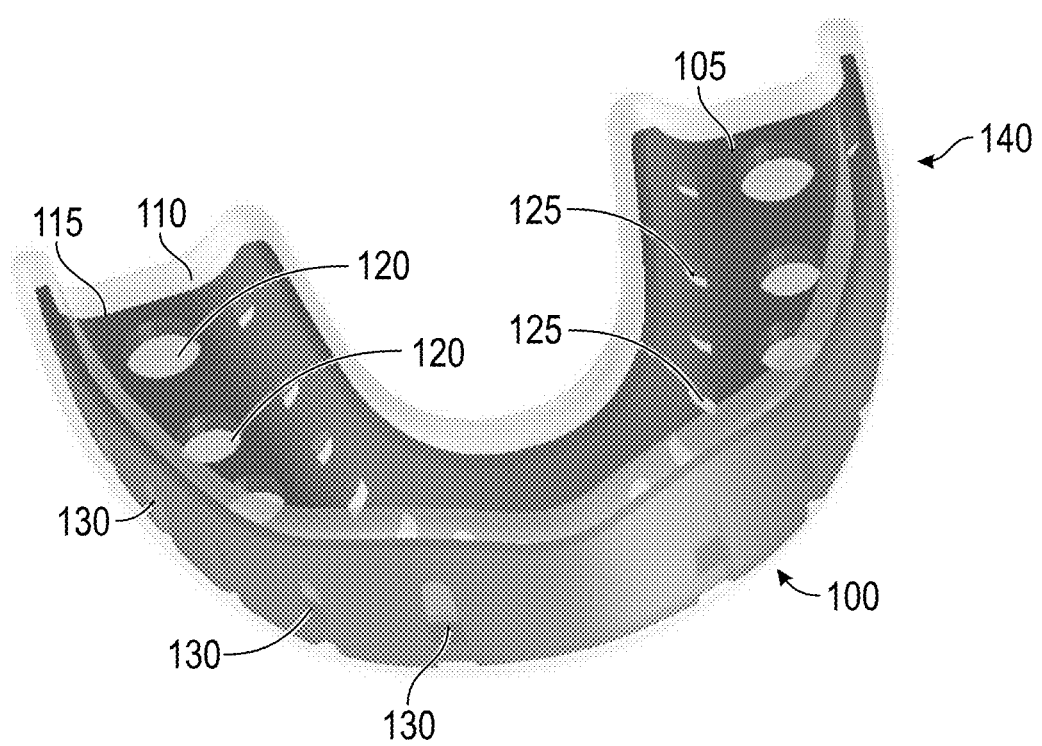
FIG. 1 shows an elevated view of the front of a mouth guard according to one embodiment.

The present disclosure relates to heat mouldable mouth guards, to methods for using the mouth guards, and to methods for producing the mouth guards.

The present disclosure is based, at least in part, on the use of a high molecular weight thermoplastic inner framework in a mouth guard which is semi-rigid at body temperature and which relaxes when heated, in combination with the use of an elastomeric thermoplastic outer layer covering the inner framework which while also temperature sensitive, is not as sensitive as the thermoplastic of the inner framework. Thus, as the inner framework (inner layer) has a lower softening or melting temperature than that of the outer layer, the outer layer holds the shape of the mouth guard as the mouth guard is heated for moulding, thereby retaining its U shape. The elastomeric thermoplastic of the outer layer has a higher or greater melting point than the semi-rigid thermoplastic of the inner framework. Further, the semi-rigid nature of the inner framework at body temperature allows the mouth guard to fit closely to the teeth and imparts further impact protection. As such, the mouth guard of the present disclosure is heat mouldable and provides an easy fit and moulds closely to the teeth. In addition, the outer elastomeric thermoplastic provides comfort for the teeth and lips, provides extra absorption for impact energy, and also allows the guard to not readily attach to orthodontic appliances.

Certain embodiments of the present disclosure provide a heat mouldable mouth guard.

In certain embodiments, the present disclosure provides a heat mouldable mouth guard, the mouth guard comprising:
an inner framework comprising a semi-rigid thermoplastic; and
an outer layer comprising an elastomeric thermoplastic which has a melting temperature higher than the semi-rigid thermoplastic of the inner framework,
wherein the outer layer substantially encapsulates the inner framework.

The term "heat mouldable" as used herein refers to a mouth guard that when heated is able to be moulded to the mouth of a user.

The term "semi-rigid" as used herein refers to a thermoplastic that has a property of being stiff, but not inflexible at body temperature. In this regard, it will be appreciated that the components of the inner framework of the present disclosure result in the inner framework being semi-rigid at body temperature.

The term "thermoplastic" refers to a polymer(s) that becomes soft/pliable when heated and less soft/pliable when cooled. The thermoplastics of the present disclosure may comprise one or more polymers, and/or one or more other compounds/components, that together provide the desired properties of the thermoplastic. For example, the thermoplastic may comprise a mix of polymers and one or more stiffeners, softeners and stabilizers.

In certain embodiments, the semi-rigid thermoplastic comprises a melting temperature of 65° C. or less. In certain embodiments, the semi-rigid thermoplastic comprises a melting temperature of 62° C. or less. In certain embodiments, the semi-rigid thermoplastic comprises a melting temperature of about 58° C.-62° C. In certain embodiments, the semi-rigid thermoplastic comprises a melting temperature of about 60° C.-62° C.

Examples of semi-rigid thermoplastics include polycaprolactone, poly(tetramethylene oxide) polymer based thermoplastics, poly(ethylene adipate) (PEA) polymer based thermoplastics, and acrylonitrile-butadiene-styrene (ABS) polymer based thermoplastics, all of which are known in the art and commercially available. Other types of semi-rigid thermoplastics are contemplated.

In certain embodiments, the semi-rigid thermoplastic comprises a high molecular weight polymer.

In certain embodiments, the semi-rigid thermoplastic polymer comprises a single polymer. In certain embodiments, the semi-rigid thermoplastic comprises a mix of polymers. In certain embodiments, the semi-rigid thermoplastic comprises two or more polymers. In certain embodiments, the inner framework comprises one or more semi-rigid thermoplastic polymers, and/or one or more other compounds/components. For example, the inner framework may comprise a mix of polymers and one or more stiffeners, softeners and stabilizers.

Examples of semi-rigid thermoplastic polymers are described herein.

In certain embodiments, the semi-rigid thermoplastic comprises a polycaprolactone polymer. Polycaprolactone polymers are known in the art. Polycaprolactone polymers are commercially available or may be synthesized by a method known in the art.

In certain embodiments, the semi-rigid thermoplastic comprises a polycaprolactone polymer having a molecular weight (Mr; g/mol) in the range from 40 kD to 120 kD, 50 kD to 120 kD, or in the range from 84 to 120 kD. In certain embodiments, the polycaprolactone polymer has a molecular weight of 40 kD or greater, 50 kD or greater, 80 kD or greater, 100 kD or greater, of 120 kD or greater. In certain embodiments, the polycaprolactone polymer has a molecular weight of at least 40 kD, at least 50 kD, at least 80 kD, at least 100 kD, or at least 120 kD.

The elastomeric thermoplastic used in the outer layer of the present disclosure provides a layer which acts as a structural backbone to the inner layer, such that when the mouth guard is heated to a temperature sufficient to make the inner framework become pliable for fitting to the teeth, the elastomeric thermoplastic(s) in the outer layer still provides a backbone to maintain the configuration of the mouth guard.

Examples of elastomeric thermoplastics include ethylene vinyl acetate (EVA) copolymers, rubbers, polyolefin polymer or polymer blends, such as propylene-ethylene copolymer, low density polypropylene, polyurethanes, polyesters, styrenic block copolymers, polyamides, silicones, and copolymers or blends/mixtures of any of the aforementioned thereof. Other types of thermoplastics are contemplated.

In certain embodiments, the elastomeric thermoplastic comprises a single polymer. In certain embodiments, the elastomeric thermoplastic comprises a mix of polymers. In certain embodiments, the elastomeric thermoplastic comprises two or more polymers.

In certain embodiments, the outer layer comprises one or more elastomeric polymers, and/or one or more other compounds/components. For example, the outer layer may comprise a mix of elastomeric and non-elastomeric polymers and one or more stiffeners, softeners and stabilizers.

In certain embodiments, the elastomeric thermoplastic comprises a melting point of higher than 65° C. In certain embodiments, the elastomeric thermoplastic comprises a melting point of about 70° C.

In certain embodiments, the elastomeric thermoplastic comprises an ethylene vinyl acetate (EVA) copolymer. EVA polymers are known in the art. EVA copolymers are commercially available.

In certain embodiments, the elastomeric thermoplastic comprises an ethylene vinyl acetate copolymer comprising 18 to 35% (w/w) or less vinyl acetate. In certain embodiments, the elastomeric thermoplastic comprises an ethylene vinyl acetate copolymer comprising 35% (w/w) or less vinyl acetate. In certain embodiments, the elastomeric thermoplastic comprises an ethylene vinyl acetate copolymer comprising 30% (w/w) or less vinyl acetate. In certain embodiments, the elastomeric thermoplastic comprises an ethylene vinyl acetate copolymer comprising about 28% (w/w) vinyl acetate. In certain embodiments, the elastomeric thermoplastic comprises an ethylene vinyl acetate copolymer comprising about 24% (w/w) vinyl acetate.

In certain embodiments, the elastomeric thermoplastic comprises a single polymer. In certain embodiments, the elastomeric thermoplastic comprises a mix of polymers. In certain embodiments, the elastomeric thermoplastic comprises two or more elastomeric thermoplastics as described herein.

In certain embodiments, the inner framework extends substantially though the entire outer layer.

In certain embodiments, the outer layer encapsulates all the inner framework. In certain embodiments, the outer layer encapsulates substantially all the inner framework.

In certain embodiments, the inner framework comprises a substantially continuous section of covering the central teeth. In certain embodiments, the inner framework comprises a substantially continuous section covering the labial and incisal edge of the central teeth. In certain embodiments, the inner framework comprises a continuous section covering all the teeth. The continuous section may be buccal, incisal and/or occlusal.

In certain embodiments, the continuous section is buccal/labial and/or incisal/occlusal and/or lingual/palatal.

Typically, the mouth guard is moulded to cover the upper teeth, although use of the mouth guard on the lower teeth is also contemplated.

In certain embodiments, the inner framework comprises one or more apertures permitting contact of the elastomeric thermoplastic on one side of the inner framework with the elastomeric thermoplastic on the other side of the inner framework. In certain embodiments, the inner framework comprises a plurality of apertures permitting contact of the elastomeric thermoplastic on one side of the inner framework with the elastomeric thermoplastic on the other side of the inner framework. In this regard, it has been found that some elastomeric thermoplastics do not bond readily with some semi-rigid thermoplastic as the use of one or more apertures can be used to remedy such deficiencies. As such, the apertures provide the ability to permit mechanical bonding of the elastomeric thermoplastic on one side to the other side of the inner framework.

In certain embodiments, the one or more apertures are located in one or more of the occlusal, incisal, palatal, lingual, buccal and labial surfaces of the inner framework. In certain embodiments, the plurality of apertures are located in one or more of the occlusal, incisal, palatal, lingual, buccal and labial surfaces of the inner framework.

In certain embodiments, the inner framework comprises a continuous section of the thermoplastic covering the upper central teeth.

In certain embodiments, the mouth guard covers up to the mucogingival junction.

In certain embodiments, the inner framework covers midway of the second molar teeth.

Methods for producing the inner framework are as described herein. In certain embodiments, the inner framework is produced using an injection moulding process.

In certain embodiments, the mouth guard is capable of being worn with orthodontics. In certain embodiments, the mouth guard is capable of being readily removed from orthodontics.

In certain embodiments, the outer layer comprises a clear or translucent layer, and/or can be coloured. The outer layer may also be clear, translucent or coloured, with additional accessories or compounds embedded or added in, for example glitter, a flavour additive, and/or an antibacterial additive.

In certain embodiments, the inner framework is coloured. Various colours or patterns of colours are contemplated. The inner layer may also be clear, translucent or coloured, with additional accessories embedded, for example but not limited to glitter or shapes.

In certain embodiments, the outer layer is clear, translucent or coloured and the inner framework is translucent, opaque or coloured, or provides desired information, so that the mouth guard can be identified or used to present desired information.

In certain embodiments, a labial facing surface of the inner framework provides presentation of desired information, for example to inform a wearer about characteristics of the mouth guard and/or promotional information/designs.

In certain embodiments, the mouth guard is heat re-mouldable. In certain embodiments, the polymers used in the outer and inner layers are selected to permit the mouth guard to be re-mouldable. For example, PCL and EVA are heat re-mouldable thermoplastics.

In certain embodiments, the mouth guard is manufactured comprising using one or more of an injection moulding process, a casting process, a pressure process, a 3D printing process, and/or a lamination process, which are known in the art. Other manufacturing methods are contemplated.

In certain embodiments, the formed mouth guard is subjected to an annealing treatment. In certain embodiments, the inner framework encapsulated with the outer layer is subjected to an annealing treatment.

In this regard, the manufacturing of the mouth guard may further comprise use of an annealing treatment to the formed mouth guard to assist with reducing thermal stress in the mouth guard prior to fitting. The thermal exposure and subsequent cooling of the formed mouth guard has been found to assist with the mouth guard maintaining its shape when subsequently heated for fitting. For example, the formed mouth guard may be heated to 120° C. for 30 minutes and then cooled (while in a mould or jig to maintain its shape), thereby reducing thermal stress in the mouth guard. Suitable temperatures and time periods for the annealing treatment may be selected.

It will be appreciated that the mouth guard of the present disclosure may also comprise one or more further layers. These layers may comprise a suitable plastic, such as a thermoplastic.

For example, in one embodiment the inner framework may comprise a thin layer of a polymer (eg silicone) between the inner framework and the outer layer. This further layer may cover the inner framework partially or completely, and be positioned inside of the inner framework, outside of the inner framework, or both.

In another embodiment, the outer layer may be covered by a further layer, partially or completely.

In certain embodiments, the present disclosure provides a heat mouldable mouth guard, the mouth guard comprising:
- an inner framework comprising a semi-rigid thermoplastic; and
- an outer layer located around the inner framework and comprising an elastomeric thermoplastic, the outer layer supporting the configuration of the inner framework when the inner framework is heat softened to become pliable.

In certain embodiments, the present disclosure provides a heat mouldable mouth guard, the mouth guard comprising:
- an inner framework comprising a semi-rigid thermoplastic; and
- an outer layer comprising an elastomeric thermoplastic, the outer layer supporting the inner framework when the inner framework becomes pliable due to heating,
- wherein the outer layer substantially encapsulates the inner framework.

In certain embodiments, the present disclosure provides a mouth guard, the mouth guard comprising:
- an inner framework comprising a polycaprolactone polymer; and
- an outer layer comprising an ethylene vinyl acetate (EVA) copolymer,
- wherein the outer layer substantially encapsulates the inner framework.

In certain embodiments, the present disclosure provides use of a mouth guard as described herein for protecting teeth from an impact injury, for protecting the teeth from grinding, or as a night guard. Other uses are contemplated.

Certain embodiments of the present disclosure provide use of a mouth guard as described herein for protecting teeth.

Certain embodiments of the present disclosure provides use of a mouth guard as described herein as a night guard.

Certain embodiments of the present disclosure provide a method of protecting teeth of a subject.

In certain embodiments, the present disclosure provides a method of protecting teeth of a subject from an impact, injury, the method comprising wearing a mouth guard as described herein and thereby protecting the teeth from an impact injury.

Certain embodiments of the present disclosure provide a method of protecting the teeth of a subject against grinding using a mouth guard as described herein.

Certain embodiments of the present disclosure provide a method of fitting a mouth guard.

In certain embodiments, the present disclosure provides a method of fitting a mouth guard for wearing by a subject, the method comprising heating a mouth guard as described herein to soften the mouth guard and fitting the heat softened mouth guard to the teeth of the subject.

Certain embodiments of the present disclosure provide a method of producing a mouth guard.

In certain embodiments, the present disclosure provides a method of producing a mouth guard, the method comprising:
- substantially encapsulating an inner framework comprising a semi-rigid thermoplastic with an outer layer comprising an elastomeric thermoplastic having a melting temperature higher than the semi-rigid thermoplastic of the inner framework; and
- producing the mouth guard.

Methods for forming the outer layer around the inner layer are as described herein.

In certain embodiments, the encapsulating of the inner framework comprises injection moulding of the elastic thermoplastic around the inner framework.

In certain embodiments, the encapsulating of the inner framework comprises connecting of the elastomeric thermoplastic on one side of the inner framework with the elastomeric thermoplastic on the other side of the inner framework using one or more, or a plurality, of apertures in the inner framework.

In certain embodiments, the method comprises one or more of an injection moulding process, a casting process, a pressure process, a 3D printing process, and a lamination process.

In certain embodiments, the method comprises a further annealing treatment of the formed mouth guard to assist with reducing any residual stress in the mouth guard.

In certain embodiments, the present disclosure provides a method of producing a mouth guard, the method comprising:
- substantially encapsulating an inner framework comprising a semi-rigid thermoplastic with an outer layer comprising an elastomeric thermoplastic having a melting temperature higher than the semi-rigid thermoplastic of the inner framework; and
- subjecting the inner framework encapsulated with the outer layer to an annealing treatment.

In certain embodiments, the present disclosure provides a method of producing a mouth guard, the method comprising:
- substantially encapsulating an inner framework comprising a semi-rigid thermoplastic with an outer layer comprising an elastomeric thermoplastic, the outer layer being capable of supporting the configuration of the inner framework when the inner framework is heat softened to become pliable;
- and producing the mouth guard.

In certain embodiments, the present disclosure provides a method of producing a mouth guard, the method comprising:
- forming an outer layer comprising an elastomeric thermoplastic around an inner framework comprising a semi-rigid thermoplastic, the outer layer being capable of supporting the inner framework when the inner framework becomes pliable due to heating; and
- producing the mouth guard.

In certain embodiments, the present disclosure provides a method of producing a mouth guard, the method comprising:
- substantially encapsulating an inner framework comprising a polycaprolactone polymer with an outer layer comprising an ethylene vinyl acetate (EVA) copolymer, and
- producing the mouth guard.

In certain embodiments, the present disclosure provides a method of producing a mouth guard, the method comprising:
- providing an inner framework having a plurality of apertures to enable a connection of the outer side of the framework to the inner side of the framework, the inner framework comprising a semi-rigid thermoplastic which is heat softenable;
- substantially encapsulating the inner framework with an elastomeric thermoplastic using the apertures to connect the elastomeric thermoplastic on the outer side of the framework to the inner side of the framework, wherein the elastomeric thermoplastic has a melting temperature higher than the semi-rigid thermoplastic of the inner framework; and producing the mouth guard.

Certain embodiments provide a mouth guard produced by a method as described herein.

Certain embodiments of the present disclosure provide an inner framework for a mouth guard.

In certain embodiments, the present disclosure provides an inner framework for a mouth guard, the inner framework comprising a semi-rigid thermoplastic and one or more apertures on the incisal/occlusal and/or the palatal/lingual surface of the framework and/or one or more apertures on the buccal/labial surface of the framework.

In certain embodiments, the inner framework comprises one or more apertures. In certain embodiments, the inner framework comprises a plurality of apertures.

Inner frameworks are as described herein. Methods for producing inner frameworks are as described herein.

Methods for producing mouth guards from an inner framework are as described herein.

In certain embodiments, the inner framework is covered by one or more layers, which may partially or completely cover the inner framework. Such layers may comprise a plastic, such as a thermoplastic. For example, the inner framework may be covered by a thin layer of a polymer such as silicone.

Certain embodiments of the present disclosure provide use of an inner framework as described herein in a mouth guard, for example a heat mouldable mouth guard or a non-heat mouldable mouth guard.

Certain embodiments of the present disclosure provide a mouth guard comprising an inner framework as described herein.

Certain embodiments of the present disclosure provide a method for producing a heat mouth guard with improved fitting characteristics.

In certain embodiments, the present disclosure provides a method of producing a heat mouldable mouth guard comprising an inner layer comprising a semi-rigid thermoplastic and an outer layer comprising an elastomeric thermoplastic, the method comprising forming the mouth guard and subjecting the formed mouth guard to an annealing treatment.

In certain embodiments, the annealing treatment comprises a thermal exposure to a temperature of 50° C. or higher.

In certain embodiments, the annealing treatment comprises a thermal exposure for a period of time of at least 20 minutes, or at least 30 minutes. In certain embodiments, the annealing treatment comprises a thermal exposure for a period of time of 20 minutes or greater, or 30 minutes or greater.

Certain embodiments of the present disclosure provide a method for improving the fitting characteristics of a heat mouldable mouth guard.

In certain embodiments, the present disclosure provides a method for improving the fitting characteristics of a heat mouldable mouth guard, the heat mouldable mouth guard comprising an inner layer comprising a semi-rigid thermoplastic and an outer layer comprising an elastomeric thermoplastic, the method comprising forming the mouth guard and subjecting the formed mouth guard to an annealing treatment.

The present disclosure is further described by the following examples. It is to be understood that the following description is for the purpose of describing particular embodiments only and is not intended to be limiting with respect to the above description.

Example 1—a Heat Re-Mouldable Mouth Guard

FIG. 1 shows an elevated view from the front of a heat reformable mouth guard 100 according to one embodiment of the present disclosure. The mouth guard 100 is a tri-laminated device for protecting the upper teeth and/or lower teeth of a user from an impact injury.

The purpose of the mouth guard 100 is to attenuate the stresses and absorb energy generated by impact to the teeth to prevent or minimise injury to the teeth and associated dental structures. The mouth guard 100 also offers dental protection to subjects with and without orthodontic appliances. Use of the mouth guard in a variety of situations is contemplated, such as use in contact sports, ball sports, and boxing, or in sports where injury to the mouth can occur such as cycling, skateboarding, gymnastics, an athletic contest where impact may cause dental injuries, for the purposes of providing protection against tooth grinding, or as a night guard for the teeth.

The mouth guard 100 is pre-shaped and has the ability to reform to provide art improved custom fit for the user. The design of the mouth guard 100 encourages a comfortable, secure custom fit for the user.

The mouth guard 100 comprises an inner framework 105, shown in solid grey colouring, comprising a thermoplastic which is semi-rigid at body temperature. The inner framework 105 acts to assist with providing a secure and close fit to the teeth and to provide additional impact protection.

The thermoplastic of the inner framework is heat softenable, typically having a melting temperature of 60-62° C. or less, and in practice permits softening of the inner framework by immersion in hot water or by heating in a microwave. For example, a polycaprolactone (PCL) polymer with a melting point of approximately 60-62° C. is suitable for use in the mouth guard 100. Such PCL polymers typically have a molecular weight (Mw) in the range from 47,000 g/mol (47 kD) to 120,000 g/mol (120 kD), a melting point of 60-62° C., a yield strength of approximately 16 MPa and a Young's modulus (at 1 mm/min) of approximately 400 MPa. Polycaprolactone polymer are known in the art, and are commercially available. For example, a polycaprolactone thermoplastic available commercially for example from Perstorp Holdings AB, Sweden is suitable for use in the inner framework. The molecular structure of the semi-rigid thermoplastic allows the thermoplastic to relax when heated.

Examples of other semi-rigid thermoplastics include poly (tetramethylene oxide) polymer based thermoplastics, poly (ethylene adipate) (PEA) polymer based thermoplastics, and acrylonitrile-butadiene-styrene (ABS) polymer based thermoplastics.

As indicated above, the use of a semi-rigid thermoplastic such as PCL for the inner framework has been determined to provide a number of benefits, including energy dispersion at body temperature, allowing the mouth guard to mould closely around teeth and gums when heated, to remain securely in position when cooled, and also provides a strong material with less associated bulk.

The inner framework 105 is produced in a generally U-shaped configuration for fitting to the teeth (typically the upper teeth, although the guard may also be fitted to the lower teeth).

As indicated above, the mouth guard 100 is a tri-laminated guard comprising the inner framework 105 and an outer layer 110 encapsulating the inner framework 105. The outer layer 110, which is shown as a clear layer in the figure, comprises an elastomeric thermoplastic, such as an ethylene vinyl acetate copolymer. The outer layer comprises an elastomeric thermoplastic which has a melting temperature that is higher than that of the semi-rigid thermoplastic of the inner framework 105. While the softening temperature at which the inner framework 105 becomes pliable is lower than that of the outer layer 110, the outer layer does still become workable with heating but is not so affected that it reverts to a highly pliable and relaxed form like the inner framework 105 when heated. In this way, the outer layer 110 structurally supports the configuration of the inner framework 105 when the inner framework 110 is heat softened. In this regard, it has been determined that an elastomeric thermoplastic having a softening or melting temperature higher than that of a semi-rigid thermoplastic provides the outer layer with the requisite characteristics to allow the outer layer 110 to structurally support the configuration of the inner framework 105 when the inner framework 110 is heat softened.

In some embodiments, the elastomeric thermoplastic of the outer layer 110 is made from an ethylene vinyl acetate (EVA) copoylmer, such as a copolymer comprising 35% or less (w/w) of vinyl acetate. For example, a suitable polymer is an ethylene-vinyl acetate with a 28% vinyl acetate content (commercially available for example from Dow Chemical Company) which has approximately 28% by weight vinyl acetate comonomer content and uses BHT antioxidant as a thermal stabilizer.

Examples of other elastomeric polymers include rubbers, polyolefin polymer or polymer blends, such as propylene-ethylene copolymer, low density polypropylene, polyurethanes, polyesters, styrenic block copolymers, polyamides, silicones, and copolymers or blends of the aforementioned polymers.

As such, the thermoplastic of the outer layer 110 is also temperature softenable, but not as sensitive to temperature as the inner framework 105, and thus the outer layer 110 holds the mouth guard in shape whilst heating is occurring. This use of two types of thermoplastics permits moulding of the mouth guard 100 closely to the teeth and gums, so as to provide a firmer custom fit. Once cooled, the inner framework 105 becomes semi-rigid and remains in a closely moulded position around the teeth and gums.

The outer elastomeric layer 110 also provides comfort for the teeth and lips as it is soft and pliable, provides extra absorption for impact energy, and allows the guard to not attach to orthodontic appliances. In this regard, the use of a polymer such as EVA also permits easier removal from orthodontic attachments and reduce the necessity of needing a barrier for braces.

In the embodiment shown, the outer layer 110 completely encapsulates the inner framework 105, and thus the inner framework 105 is covered by the outer layer 110. However, it will also be appreciated that a mouth guard may be produced where the outer layer 110 extends well past the end 115 of the inner framework 105 (for example by 2-5 mm), this permitting (for example) the end of the outer layer 110 to be trimmed later to size by the user. In another embodiment, the outer layer 110 does not completely encapsulate the inner framework 105.

In the embodiment shown, the mouth guard 100 covers teeth to the midway of the second molars, and also provides coverage to the mucogingival junction, for maximum protection and retention. This higher outer boarder also aids in protecting the underlying roots of the teeth. In some embodiments, the outer occlusal layer has a thickness of 1 mm to 3 mm.

In the mouth guard 100, the inner framework 105 comprises a plurality of apertures 120, 125 and 130 permitting contacting of the elastomeric thermoplastic on one side of the inner framework 105 with the elastomeric thermoplastic on the other side of the inner framework 105. In this regard, it has been found that thermoplastics such as EVA do not adhere well to PCL, and therefore the bonding of EVA to PCL remains problematic. Apertures within the inner framework 105 allow for the EVA on the outer side to connect or attach to the EVA on the inner side, thereby enabling the inner framework 105 to be encapsulated. For example, when injection moulding or pressure/suction moulding is used to produce the mouth guard, the apertures permit the EVA to flow through the apertures, thereby allowing a connection between the EVA on the outside and the inside of the inner framework, and thereby holding the PCL in its preferred position.

This ability to interlock the polymers permits each polymer to still utilize their independent characteristics despite being fabricated into a single device.

In certain embodiments, the inner framework 105 comprises a plurality of apertures 120, 125 and 130 which are located in one or more of an occlusal, incisal, palatal, lingual, buccal and labial surface of the inner framework 105.

In the embodiment shown, it should be noted that the outer layer 110 may also be thicker on the occlusal surface to offer further protection for tooth-on-tooth impact. In addition, the mouth guard 100 has rounded inner biting surfaces (not visible) and outer biting surfaces 140 on the inside and outside borders, which removes the unnecessary squareness and offers a less bulky feel once fitted.

The mouth guard 100 also provides minimal palatal coverage to prevent gagging.

The elastomeric outer layer 110 provides three important benefits: comfort for lips and dental structures, absorption of impact energy, and to reduce adhesion to orthodontic appliances.

In some embodiments, the mouth guard 100 may comprise one or more further layers. These one or more further layer may impart additional desirable characteristics to the mouth guard, and/or be used to convey information.

For example, in one embodiment a further layer may be located between the PCL inner framework 105 and the outer EVA layer 110. This layer may partially or completely cover the inner framework 105, and be located on the outside of the inner framework 105, inside the inner framework 105, or both. This further layer may be composed of a suitable plastic, such as a thermoplastic.

In another embodiment, the outer layer 110 may be covered (partially or completely) by another layer, such as a suitable thermoplastic.

In some embodiments, the mouth guard 100 may further incorporate colours, advertising logos and other information. For example, in the situation where the EVA outer layer 110 is transparent, the inner layer 105 may be translucent, opaque or coloured, or provide product information such as different sizes of the mouth guard 100. In another embodiment, the area of the inner framework 105 at the front of the mouth guard 100 covering the front teeth may present desired information on the inner framework 105 and thereby can be seen from the front of the mouth guard 100 when the outer layer is clear or translucent. Examples of desired information include some form of notation, a company logo for advertising purposes or club information/colours etc.

It will be appreciated that the mouth guard 100 of the embodiment described is a "boil & bite" type, pre-shaped mouth guard. To fit the mouth guard 100 to the mouth of a user, the mouth guard 100 is immersed in freshly boiled water, and the mouth guard left for a suitable period of time (typically 20-60 seconds) to soften, placed in the mouth of the user, biting down on the softened mouth guard 100 and firmly pushing against the mouth guard 100 with finger and tongue pressure and mouth suction. The process can be repeated for re-moulding if there are changes in the dental structure of the user, or if a tighter or looser fit is required.

The mouth guard 100 may be produced by a number of methods, for example, by a heat pressing method or by injection moulding.

For example, in one embodiment, the mouth guard is produced using a 3 part injection moulding process. The inner framework is first produced by injection moulding PCL into a first mould. The injection moulded PCL is then placed into a second mould, and an inner or outer layer of EVA injection moulded onto the PCL framework. Finally, the 2 part EVA/PCL product is placed into a third mould and the alternate side EVA layer injection moulded onto the product.

In another embodiment, to manufacture the mouth guard three starting components may be utilised: an injection moulded inner frame (eg PCL), and upper and lower layers made of the elastomeric thermoplastic (eg EVA) (formed for example by injection moulding each component). In this embodiment, the mouth guard may be manufactured by applying pressure and/or heat to the three layers to bring them together by pressure moulding or pressure lamination, thereby producing the mouth guard.

Other methods for forming the mouth guard include processes such as a casting process, a 3D printing process, a lamination process, or a combination of any one or more of the aforementioned processes described herein.

The mouth guard of the present disclosure may therefore be produced using a method as described herein to produce a formed mouth guard.

It has also been found that the formed mouth guard produced as described herein may still possess some residual polymer stress, which can result in the formed mouth guard contracting out of shape when it is softened in boiling water for fitting. To reduce such residual polymer stress, it has been found that the formed mouth guard may be subjected to an annealing treatment. For example, the completed injection moulded mouth guard may be placed on a pre-formed aluminium jig and heated to 120° C. for 30 minutes and allowed to cool to room temperature. This further thermal processing step has been found to reduce the tendency of the mouth guard to contract out of shape later when heated for fitting. The exposure of the formed mouth guard to such an annealing process thereby improves the usability of the formed mouth guard.

Figure 2:
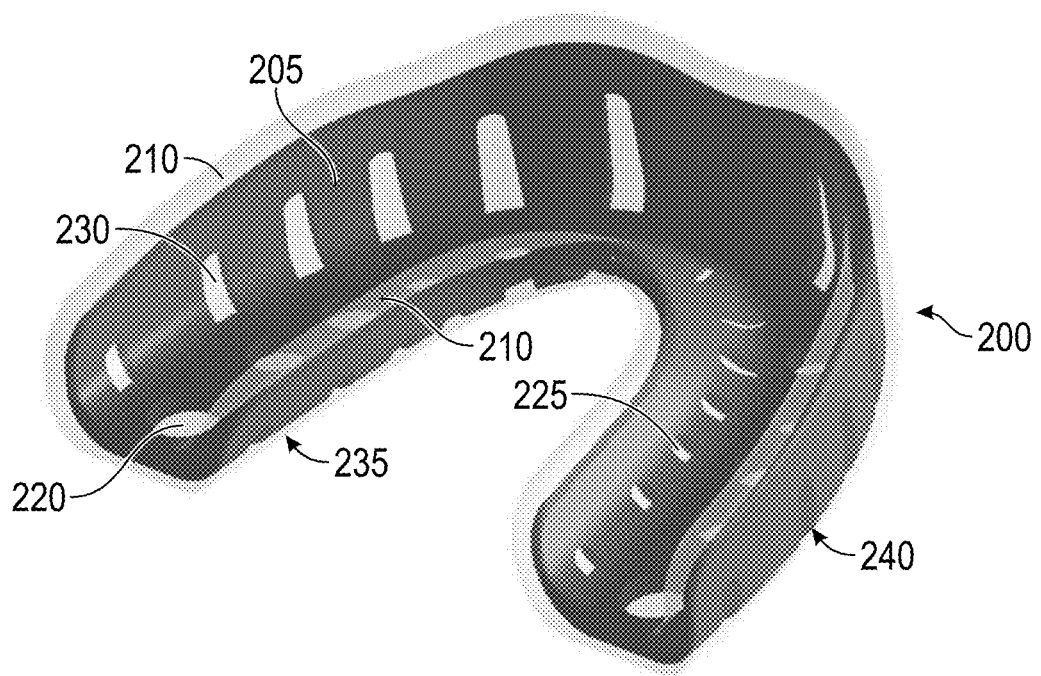
FIG. 2 shows an elevated view of the rear of a mouth guard according to the embodiment provided in FIG. 1.

FIG. 2 shows arm elevated view from the rear of a heat reformable mouth guard 200 according to the embodiment described in FIG. 1.

The mouth guard 200 comprises an inner framework 205, shown in solid grey colouring, comprising a thermoplastic which is semi-rigid at body temperature. The inner framework 205 is encapsulated by an outer layer 210 made from an elastomeric thermoplastic which has a melting temperature that is higher than that of the semi-rigid thermoplastic of the inner framework 205.

The inner framework 205 comprises a plurality of apertures 220, 225 and 230 which permit contact of the elastomeric thermoplastic on one side of the inner framework 205 with the elastomeric thermoplastic on the other side of the inner framework (205) through the apertures.

In the embodiment shown, the apertures 220 are located on the incisal/occlusal surface of the inner framework 205. The apertures 225 are located on the palatal/lingual surface of the inner framework 205, and the apertures 230 are located on the labial/buccal surface.

In the embodiment shown, the outer layer 210 may also be thicker on the occlusal outer base surface to offer further protection for tooth on tooth impact. For example, the outer layer on the outer occlusal surface may be 1-3 mm thick and 0.5-2 mm thick on the inner occlusal surface.

In addition, the mouth guard 200 has a rounded biting surfaces 235 and 240 on the inside and outside borders, which removes the unnecessary squareness and offers a less bulky feel once fitted.

FIG. 2 also shows some exemplary dimensions (in mm) for various parts of the mouth guard.

Figure 3:
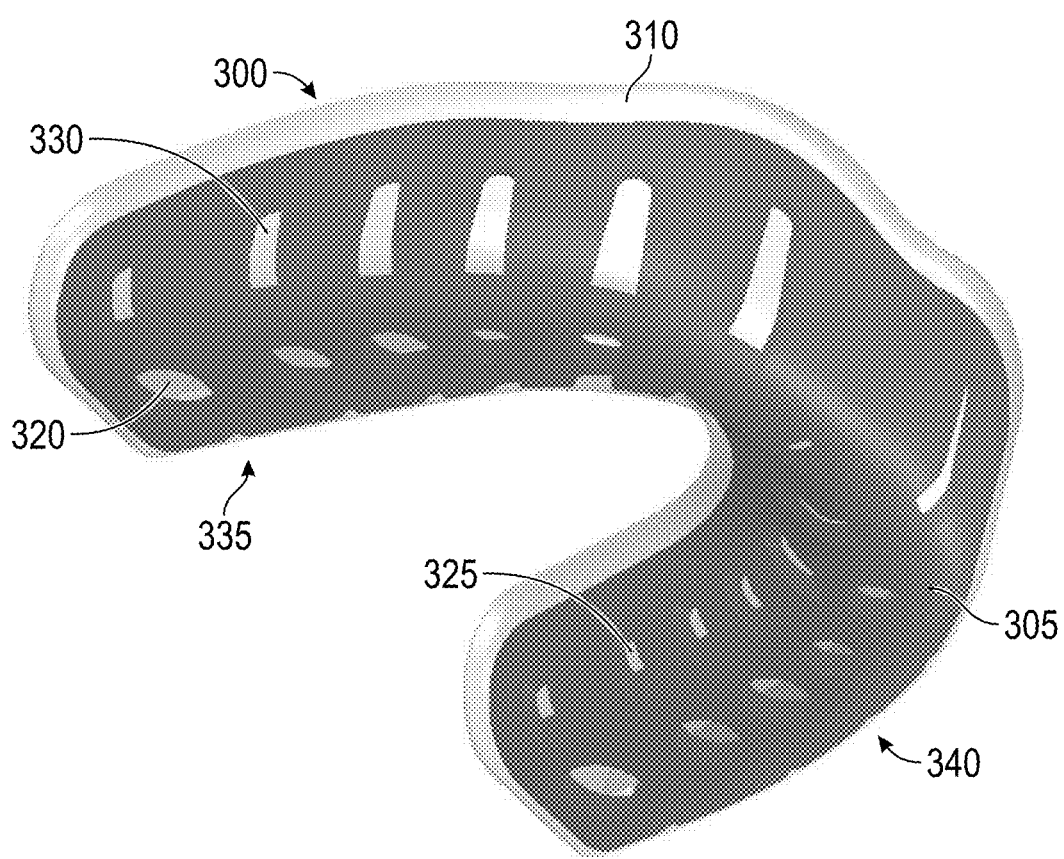
FIG. 3 shows an underside view of a mouth guard according to the embodiment provided in FIG. 1.

FIG. 3 shows an underside view of a heat reformable mouth guard 300 according to the embodiment described above.

The mouth guard 300 comprises an inner framework 305 (eg PCL), shown in solid grey colouring, comprising a thermoplastic which is semi-rigid at body temperature. The inner framework 305 is encapsulated by an outer layer 310 made from an elastomeric thermoplastic which has a melting temperature that is higher than that of the semi-rigid thermoplastic of the inner framework 305.

The inner framework 305 comprises a plurality of apertures 320, 325 and 330 which permit contact of the elastomeric thermoplastic on one side of the inner framework 305 with the elastomeric thermoplastic on the other side of the inner framework (305) through the apertures.

In the embodiment shown, the apertures 320 are located on the occlusal and incisal surface of the inner framework 305. The apertures 325 are located on the palatal and lingual surface of the inner framework 305, and the apertures 330 are located on the buccal and labial surface.

In the embodiment shown, the outer layer 310 may also be thicker on the occlusal surface (1-3 mm) to offer further protection for tooth on tooth impact. In addition, the mouth guard 300 has rounded biting surfaces 335 and 340 on the inside and outside borders, which removes the unnecessary squareness and offers a less bulky feel once fitted.

Although the present disclosure has been described with reference to particular embodiments, it will be appreciated that the disclosure may be embodied in many other forms and is not limited to the embodiments described. It will also be appreciated that the disclosure described herein is susceptible to variations and modifications other than those specifically described. It is to be understood that the disclosure includes all such variations and modifications. The disclosure also includes all of the steps, features, compositions and compounds referred to, or indicated in this specification, individually or collectively, and any and all combinations of any two or more of the steps or features.

Also, it is to be noted that, as used herein, the singular forms "a", "an" and "the" include plural aspects unless the context already dictates otherwise.

Throughout this specification, unless the context requires otherwise, the word "comprise", or variations such as "comprises" or "comprising", will be understood to imply the inclusion of a stated element or integer or group of elements or integers but not the exclusion of any other element or integer or group of elements or integers.

Reference to any prior art in this specification is not, and should not be taken as, an acknowledgment or any form of suggestion that this prior art forms part of the common general knowledge in any country.

The subject headings used herein are included only for the ease of reference of the reader and should not be used to limit the subject matter found throughout the disclosure or the claims. The subject headings should not be used in construing the scope of the claims or the claim limitations.

The description provided herein is in relation to several embodiments which may share common characteristics and features. It is to be understood that one or more features of one embodiment may be combinable with one or more features of the other embodiments. In addition, a single feature or combination of features of the embodiments may constitute additional embodiments.

All methods described herein can be performed in any suitable order unless indicated otherwise herein or clearly contradicted by context. The use of any and all examples, or exemplary language (e.g., "such as") provided herein, is intended merely to better illuminate the example embodiments and does not pose a limitation on the scope of the claimed invention unless otherwise claimed. No language in the specification should be construed as indicating any non-claimed element as essential.

Future patent applications may be filed on the basis of the present application, for example by claiming priority from the present application, by claiming a divisional status and/or by claiming a continuation status. It is to be understood that the following claims are provided by way of example only, and are not intended to limit the scope of what may be claimed in any such future application. Nor should the claims be considered to limit the understanding of (or exclude other understandings of) the present disclosure. Features may be added to or omitted from the example claims at a later date

The invention claimed is:

1. A heat mouldable mouth guard, the mouth guard comprising:
    an inner framework comprising a thermoplastic; and
    an outer layer comprising an elastomeric thermoplastic which has a melting temperature higher than the thermoplastic of the inner framework,
    wherein the outer layer encapsulates the inner framework.

2. The heat mouldable mouth guard according to claim 1, wherein the thermoplastic of the inner framework comprises a melting temperature of 65° C. or less.

3. The heat mouldable mouth guard according to claim 1, wherein the thermoplastic of the inner framework comprises a polycaprolactone polymer.

4. The heat mouldable mouth guard according to claim 1, wherein the thermoplastic of the inner framework comprises a polycaprolactone polymer/matrix having a molecular weight in the range from 50,000 to 120,000 g/mol.

5. The heat mouldable mouth guard according to claim 1, wherein the elastomeric thermoplastic of the outer layer comprises a melting temperature of higher than 65° C.

6. The heat mouldable mouth guard according to claim 1, wherein the elastomeric thermoplastic of the outer layer comprises an ethylene vinyl acetate copolymer.

7. The heat mouldable mouth guard according to claim 1, wherein the elastomeric thermoplastic of the outer layer comprises an ethylene vinyl acetate copolymer comprising 30% (w/w) or less vinyl acetate.

8. The heat mouldable mouth guard according to claim 1, wherein the inner framework comprises one or more apertures permitting contact of the elastomeric thermoplastic on one side of the inner framework with the elastomeric thermoplastic on the other side of the inner framework.

9. The heat mouldable mouth guard according to claim 1, wherein the inner framework comprises a continuous section of the thermoplastic of the inner framework covering the labial and incisal edge of the central teeth.

10. The heat mouldable mouth guard according to claim 1, wherein the inner framework covers midway of the second molar teeth.

11. The heat mouldable mouth guard according to claim 1, wherein the mouth guard is capable of being worn with orthodontics.

12. The heat mouldable mouth guard according to claim 1, wherein the mouth guard is heat re-mouldable.

13. The heat mouldable mouth guard according to claim 1, wherein the mouth guard is used for providing protection in a contact sport, a ball sport, boxing, cycling, skateboarding, gymnastics, for providing protection against tooth grinding, or as a night guard.

14. A method of protecting teeth of a subject from an impact injury, the method comprising wearing a mouth guard according to claim 1 and thereby protecting the teeth from an impact injury.

15. Use of a mouth guard according to claim 1 for protecting teeth from an impact injury.

16. A method of fitting a mouth guard for wearing by a subject, the method comprising heating the mouth guard according to claim 1 and fitting the heat softened mouth guard to the teeth of the subject.

17. The heat mouldable mouth guard according to claim 1, wherein the thermoplastic of the inner framework comprises a semi-rigid thermoplastic that is stiff but not inflexible at body temperatures.

18. The heat mouldable mouth guard according to claim 1, wherein the outer layer completely encapsulates the inner framework.

19. A heat mouldable mouth guard, the mouth guard comprising:
    an inner framework comprising a thermoplastic; and
    an outer layer comprising an elastomeric thermoplastic, the outer layer supporting the inner framework when the inner framework becomes pliable due to heating,
    wherein the outer layer encapsulates the inner framework.

20. The heat mouldable mouth guard according to claim 19, wherein the elastomeric thermoplastic comprises a higher melting temperature than the thermoplastic of the inner framework.

21. The heat mouldable mouth guard according to claim 19, wherein the thermoplastic of the inner framework comprises a semi-rigid thermoplastic that is stiff but not inflexible at body temperatures.

22. The heat mouldable mouth guard according to claim 19, wherein the outer layer completely encapsulates the inner framework.

23. A heat mouldable mouth guard, the mouth guard comprising:
    an inner framework comprising a thermoplastic; and
    an outer layer encapsulating the inner framework and comprising an elastomeric thermoplastic, the outer layer supporting the configuration of the inner framework when the inner framework is heat softened to become pliable.

24. The heat mouldable mouth guard according to claim 23, wherein the elastomeric thermoplastic comprises a higher melting temperature than the thermoplastic of the inner framework.

25. The heat mouldable mouth guard according to claim 23, wherein the thermoplastic of the inner framework comprises a semi-rigid thermoplastic that is stiff but not inflexible at body temperatures.

* * * * *